(12) United States Patent
Usui et al.

(10) Patent No.: US 6,495,629 B2
(45) Date of Patent: Dec. 17, 2002

(54) MODIFIED POLYOLEFIN RESIN COMPOSITION AND USES THEREOF

(75) Inventors: Kazuhiro Usui, Iwakuni (JP); Kenichi Fujino, Iwakuni (JP); Terumasa Fujitaka, Iwakuni (JP); Koji Masumoto, Iwakuni (JP); Hidetoshi Yoshioka, Iwakuni (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 09/805,999

(22) Filed: Mar. 15, 2001

(65) Prior Publication Data

US 2001/0036997 A1 Nov. 1, 2001

(30) Foreign Application Priority Data

Mar. 31, 2000 (JP) ........................................ 2000-099081

(51) Int. Cl.7 ...................... C08F 255/00; C08F 255/02; C08F 255/04; C08L 51/06
(52) U.S. Cl. ......................... 525/71; 525/285; 525/301; 525/319; 525/322; 525/324
(58) Field of Search ........................... 525/71, 285, 301, 525/319, 322, 324

(56) References Cited

U.S. PATENT DOCUMENTS 3,896,067 A    7/1975   Kosaka et al.
5,312,867 A  * 5/1994   Mitsauno et al.
5,322,894 A  * 6/1994   Fuji et al.
5,494,962 A    2/1996   Gauthy et al.

FOREIGN PATENT DOCUMENTS

| EP | 0 396 055  | 11/1990 |
|----|------------|---------|
| JP | 06-256731  | 9/1994  |
| JP | 07-082328  | 3/1995  |
| JP | 07-097452  | 4/1995  |
| JP | 07-267692  | 10/1995 |
| JP | 08-034960  | 2/1996  |
| JP | 2000-017121| 1/2000  |

* cited by examiner

Primary Examiner—Jeffrey Mullis
(74) Attorney, Agent, or Firm—Oblon, Spivak, McClelland, Maier & Neustadt, P.C.

(57) ABSTRACT

A novel chlorine-free modified polyolefin resin composition with excellent adherence to nonpolar substrates, excellent solubility in solvents, excellent compatibility with other resins, and without tack after painting and drying is obtainable by graft modifying a mixed resin having 40 to 99 parts by weight of polyolefin resin (A) and 1 to 60 parts by weight of ethylenic compound-unsaturated carboxylic acid copolymer (B) that contains 0.1 to 50% by weight of unsaturated carboxylic acid derivative, with unsaturated carboxylic acid derivative and/or its anhydride (C), the modified polyolefin resin composition having weight average molecular weight of 20,000 to 150 000 and the grafting weight of (C) being 0.1 to 20% by weight.

16 Claims, No Drawings

MODIFIED POLYOLEFIN RESIN COMPOSITION AND USES THEREOF

BACKGROUND OF THE INVENTION

The present invention relates to a novel chlorine-free modified polyolefin resin composition with excellent adherence to nonpolar sheets, films and moldings of polypropylene, polyethylene, ethylene-propylene copolymer, ethylene-propylene-diene copolymer, ethylene-vinyl acetate copolymer, etc. with excellent solvent solubility and compatibility with other resins, and with no tack after painting and drying.

Because of low price and many excellent properties such as moldability, chemical resistance, water resistance and electrical characteristics, polyolefins such as polypropylene and polyethylene are adopted widely in recent years as sheets, films and moldings, etc. Different from polar substrates such as polyurethane resin, polyamide resin, acrylic resin and polyester resin, however, polyolefin substrates are nonpolar and crystalline, leading to drawbacks of difficult paintability and adhesion.

So far, acid-modified polyolefins provided with various acid modifications to polyolefin or their chlorinated products have been used as paint additives, primers and adhesives, because of excellent adherence to said nonpolar substrates. While acid-modified chlorinated polyolefins are excellent in the adherence to substrates, solubility into solvent, compatibility with other resins, etc., the uses thereof have become to be kept at a distance from viewpoint of environmental problems in recent years.

On the other hand, while acid-modified chlorinated polyolefins have the adherence to nonpolar substrates, they have strong tack after painting and drying, thus arising problems of difficult winding of film after painting and handling of substrate, clinging of dirts, etc. Moreover, it has been known that, by using additives such as filler, the tack can be reduced, but remarkably decreased adherence cannot be avoided in this case, which posed a problem.

As another solution, a technique that alleviates the tack by blending with rigid tack-free resins has been known. But such rigid tack-free resins have poor solvent solubility as a rule, which posed a problem.

Furthermore, chlorine-free polyolefins are liable to have poorer solubility into solvent and compatibility with other resins compared with chlorinated ones, leading to restricted utilization toward the uses aforementioned. Based on the background as these, the development of a novel resin composition that combines excellent adherence to nonpolar substrates, solvent solubility, compatibility with other resins and low tackiness has been expected.

Conventionally, as the inventions that utilized ethylenic compound-maleic anhydride copolymer aiming at the adherence to polyolefin substrates, Japanese Unexamined Patent Publication Nos. Hei 6-256731, Hei 7-82328, Hei 7-97452, Hei 7-267692, Hei 8-34960, 2000-17121, etc. are mentioned. In these inventions, by using ethylenic compound-maleic anhydride copolymer and polyolefin or low-viscosity resin in combination, or adding additional modification, resins suitable for the moldings, hot melt adhesives, etc. were found.

However, since these resins did not necessitate the solubility into solvent and compatibility with other resins, they could not be utilized for primer, paint, ink binder, adhesive, etc. Moreover, when simply combining with low-viscosity resin, when conducting modification, or the like, problems of occurrence of tack in dried film, etc. also arose.

In the field at which the invention aims, therefore, there has been no precedent hitherto, in which a characteristic resin was developed, utilizing ethylenic compound-maleic anhydride copolymer.

The purpose of the invention lies in providing a novel chlorine-free modified polyolefin resin composition with excellent adherence to nonpolar resin moldings, with excellent solvent solubility and compatibility with other resins, and with no tack after painting and drying. As a result of diligent investigations for solving this subject, the inventors have found that this purpose can be accomplished only when unsaturated carboxylic acid derivative and/or its anhydride is graft polymerized at a particular rate onto a raw material with polyolefin resin mixed with ethylenic compound-unsaturated carboxylic acid copolymer at a particular rate, leading to the invention based on this knowledge.

SUMMARY OF THE INVENTION

According to the invention, following (1) through (6) are provided.

(1) A modified polyolefin resin composition obtainable by graft modifying a mixed resin comprising 40 to 99 parts by weight of polyolefin resin (A) and 1 to 60 parts by weight of ethylenic compound-unsaturated carboxylic acid copolymer (B) that contains 0.1 to 50% by weight of unsaturated carboxylic acid derivative, with unsaturated carboxylic acid derivative and/or its anhydride (C), the modified polyolefin resin composition having weight average molecular weight of 20,000 to 150,000 and the grafting weight of (C) being 0.1 to 20% by weight.

(2) A modified polyolefin composition obtainable by graft modifying a mixed resin comprising 40 to 99 parts by weight of polyolefin resin (A) and 1 to 60 parts by weight of ethylenic compound-unsaturated carboxylic acid copolymer (B) that contains 0.1 to 50% by weight of unsaturated carboxylic acid derivative, with unsaturated carboxylic acid derivative and/or its anhydride (C) and ethylenic unsaturated compound (D), the modified polyolefin resin composition having weight average molecular weight of 20,000 to 150,000 and the grafting weights of (C) and (D) being 0.1 to 20% by weight, respectively.

(3) An adhesive containing the modified polyolefin resin composition of (1) or (2).

(4) A primer containing the modified polyolefin resin composition of (1) or (2).

(5) A paint binder containing the modified polyolefin resin composition of (1) or (2).

(6) An ink binder containing the modified polyolefin resin composition of (1) or (2).

DETAILED DESCRIPTION OF THE INVENTION

The nonpolar resins to become the adherends of the invention point to sheets, films and moldings of polypropylene, polyethylene, ethylene-propylene copolymer and ethylene-vinyl acetate copolymer. Also, they include these substrates surface-treated with plasma, corona or the like.

The polyolefin resins (A) to be used in the invention are homo- or co-polymers of α-olefins with number of carbon atoms of not less than 2 to not more than 20, preferably not less than 2 to not more than 6 such as ethylene, propylene, butene-1, pentene-1, hexene-1, heptene-1, octene-1 and 4-methyl-1-pentene, cyclopentene, cyclohexene chain or cyclic polyenes such as 1,4-hexadiene, 1,5-hexadiene, divinylbenzene, 1,3-cyclopentadiene, 1,3-cyclohexadiene and 5-vinyl-2-norbornene, or styrene, substituted styrene, etc.

The proportion of such monomer in polymer can be selected arbitrarily, but, in the case of polypropylene being the adherend, since the inventive modified polyolefin resin composition has the adherence to adherend, the proportion of propylene is preferable to be not less than 50% to not more than 98%. If under 50%, then the adherence to adherend is poor, and, if over 98%, the flexibility is insufficient. The usable molecular weight of polymer can be selected freely so as the weight average molecular weight of the modified polyolefin resin composition after addition of ethylenic compound-unsaturated carboxylic acid copolymer (B) and modification to become 20,000 to 150,000, For example, even a polymer with weight average molecular weight of over 150,000 becomes usable by the publicly known methods for adjusting the molecular weight to suitable range by degrading in the presence of heat or radical, and the like.

The ethylenic compound-unsaturated carboxylic acid copolymers (B) are ethylene-maleic anhydride copolymer, ethylene-propylene-maleic anhyride copolymer, ethylene-propylene-butene-maleic anhyride copolymer, ethylene-propylene-diene-maleic anhyride copolymer, copolymers of these with (meth)acrylic acid or its ester, or mixtures of at least two or more kinds selected from the group as described. Preferably, it is desirable to use ethylene-maleic anhyride copolymer or ethylene-acrylic ester-maleic anhyride copolymer. The content of unsaturated carboxylic acid in these copolymers is preferable to be 0.1 to 50% by weight, particularly 1 to 40% by weight. If under this range, then the solvent solubility is aggravated and, if above, the solvent transparency is aggravated, which is unpreferable. The usable molecular weight of polymer can be selected freely similarly to the case of (A). For example, even if the weight average molecular weight of polymer is under 20,000, it is only necessary for the molecular weight of the modified polyolefin resin composition to be within a range of 20,000 to 150,000 finally by increasing the molecular weight through crosslinking at the time of reaction or by properly selecting (A) to be used simultaneously.

Moreover, the proportion of (A) in the mixed resin of (A) and (B) is preferable to be 40 to 99% by weight, particularly 50 to 95% by weight. If under this range, then the solvent solubility and the adherence of modified polyolefin resin composition are aggravated, or decreased operativity, poor reaction, etc. due to increased viscosity at the time of reaction generate. If above this range, the tack occurs.

Unsaturated carboxylic acid derivatives and/or their anhydrides (C) are those modified with maleic acid, itaconic acid, citraconic acid, aconitic acid and their anhydrides, or (meth) acrylic acid or its ester. Moreover, preferably, it is desirable to use maleic anhydride or aconitic anhydride. The grafting weight of (C) in the modified polyolefin resin composition is preferable to become 0.1 to 20% by weight, particularly 1 to 10% by weight. If the grafting weight is under this range, then the solvent solubility and the adherence of modified polyolefin resin composition decrease. Also, if above inversely, much unreacted materials generate, which is unpreferable.

The ethylenic unsaturated compound (D) is at least one kind of compound selected from (meth)acrylic esters with number of carbon atoms of 1 to 12 such as glycidyl (meth)acrylate, cyclohexyl (meth)acrylate and ethyl acrylate, vinyl ethers such as butyl vinyl ether and cyclohexyl vinyl ether, styrenic compounds such as styrene, α-methylstyrene, p-methylstyrene, t-butylstyrene, ethylstyrene, cyanostyrene, aminostyrene, hydroxystyrene, vinyltoluene and N,N-diethylaminostyrene, and maleimides such as maleimide, N-phenylmaleimide and N-cyclohexylmaleimide. Preferably, it is desirable to use styrene. The grafting weight of (D) in the modified polyolefin resin composition is preferable to become 0.1 to 20% by weight, particularly 1 to 10% by weight. If the grafting weight is under this range, then the grafting weight of (C) in the modified polyolefin resin composition decreases, hence much unreacted materials of (C) tend to remain in the system. Also, if above inversely, the molecular weight increases and the solvent solubility are aggravated, which is unpreferable.

To the modified polyolefin resin composition of the invention, the stabilizer to adjust the stability of resin composition, the radical initiator to promote the reaction, and the like can be formulated further, depending on the purpose for use.

As the stabilizers, hydroquinone, benzoquinone, nitrosophenyl-hydroxy compound, etc. can be mentioned. The radical initiator can be selected appropriately from publicly known products, but, for example, it is preferable to use organic peroxides such as benzoyl peroxide, dicumyl peroxide, lauroyl peroxide, di-t-butyl peroxide and cumene hydroperoxide.

The grafting reaction by the use of said compounds to obtain the modified polyolefin resin composition can be conducted by publicly known methods. For example, the solution method wherein the mixed resin of (A) and (B) is dissolved into solvent such as toluene under heating and then (C) and (D) are added, the melt method wherein, to the mixed resin of (A) and (B) molten by employing Banbury mixer, kneader, extruder, etc., (C) and (D) are added, and the like are mentioned. As the addition method of (C) and (D), they may be added one by one or in a lump, and the order is also not minded.

The weight average molecular weight of modified polyolefin resin composition thus obtained is 20,000 to 150,000, preferably 30,000 to 120,000. If under 20,000, then the adherence to nonpolar substrates and the cohesion become poor, and, if over 150,000, the workability, solubility into solvent and compatibility with other resins decrease due to increased viscosity. The weight average molecular weight can be determined by means of publicly known methods, for example, GPC method, light scattering method, etc. Moreover, the identification of the reaction can be performed by alkali titration method, FT-IR, NMR, etc.

The inventive modified polyolefin resin composition can be used as an adhesive or primer for nonpolar substrates, paint binder resin and ink binder resin. It can be used in the forms adapted to uses such as solution, powder and sheet. Moreover, at that time, additives, for example, antioxidant, light stabilizer, ultraviolet absorber, pigment, dye, inorganic filler, etc. may be formulated, if need be.

In the applications to adhesive and ink binder resin, not only nonpolar substrates such as polyethylene and polypropylene, but also polar substrates such as polyester, polyurethane and polyamide are often used in combination. The inventive resin also has the adherence to such polar substrates, hence it is suitable also for said applications.

Similarly, when using as a binder resin for primer paint, it is excellent in the adherence to upper paint and clear coating, hence it is suitable also for said application.

When using as an ink binder, other resins such as urethane resin, epoxy resin, acrylic resin, phenol resin, alkyd resin, polyamide resin, polyimide resin, silicone resin and nitrocellulose may be blended, if need be.

When blending with other resins in these applications, it is required to use the inventive modified polyolefin resin composition in amounts of at least 5% or more by solids based on overall resin weight to maintain the adherence to nonpolar substrates.

Moreover, the inventive resin can also be used after curing reaction with epoxy, isocyanate, etc.

In following, the invention will be illustrated in more detail based on examples, but the invention is not confined thereto.

EXAMPLE

Example 1

In a four-neck flask attached with stirrer, cooling pipe and dropping funnel, 90 g of propylene-ethylene copolymer (propylene component 97.5 mol %, ethylene component 2.5 mol %, weight average molecular weight 250,000) and 10 g of ethylene-ethyl acrylate-maleic anhydride copolymer (Bondine HX8210 from Sumika Atochem) were dissolved into 400 g of toluene under heating. Then, while keeping the temperature of system at 110° C. and stirring, 1 g of dicumyl peroxide was added dropwise and, thereafter, the degradation treatment was performed for 1 hour. Next, 10 g of aconitic anhydride, 0.5 g of benzoyl peroxide were added dropwise over 3 hours, respectively, and the mixture was reacted further for 1 hour. After the reaction, the reaction product was cooled to room temperature and then purified by throwing into a large quantity of acetone to obtain a modified polyolefin resin composition with weight average molecular weight of 51,000 and grafted weight of aconitic anhydride of 5.8% by weight. The weight average molecular weight was determined by GPC and the grafted weight by alkali titration method or FT-IR, respectively.

Example 2

Into a biaxial extruder with L/D=34 and φ=40 mm, 80 parts by weight of propylene-ethylene-α-olefin copolymer (propylene component 68 mol %, ethylene component 8 mol %, butene component 24 mol %, weight average molecular weight 60,000), 20 parts by weight of ethylene-maleic anhydride copolymer (ethylene component 90% by weight, maleic anhydride component 10% by weight, weight average molecular weight 25,000), 2 parts by weight of maleic anhydride and 1.5 parts by weight of dicumyl peroxide were charged. The reaction was conducted under the conditions of retention time of 10 minutes and barrel temperature of 180° C. (first barrel to seventh barrel), and deaeration was performed at seventh barrel to remove residual unreacted materials. The weight average molecular weight of modified polyolefin resin composition obtained was 42,000 and the grafted weight of maleic anhydride was 1.2% by weight.

Example 3

Into a biaxial extruder with L/D=34 and φ=40 mm, 70 parts by weight of propylene-ethylene-α-olefin copolymer (propylene component 68 mol %, ethylene component 8 mol %, butene component 24 mol %, weight average molecular weight 60,000), 30 parts by weight of ethylene-methacrylic acid-maleic anhydride copolymer (ethylene component 85% by weight, methacrylic acid component 5% by weight, maleic anhydride component 10% by weight, weight average molecular weight 35,000), 6 parts by weight of maleic anhydride and 2 parts by weight of lauroyl peroxide were charged. The reaction was conducted under the conditions of retention time of 10 minutes and barrel temperature of 190° C. (first barrel to seventh barrel), and deaeration was performed at seventh barrel to remove residual unreacted materials. The weight average molecular weight of modified polyolefin resin composition obtained was 37,000 and the grafted weight of maleic anhydride was 3.2% by weight.

Example 4

In a four-neck flask attached with stirrer, cooling pipe and dropping funnel, 60 g of propylene-ethylene copolymer (propylene component 97.5 mol %, ethylene component 2.5 mol %, weight average molecular weight 250,000) and 40 g of ethylene-ethyl acrylate-maleic anhydride copolymer (Bondine HX8210 from Sumika Atochem) were dissolved into 400 g of toluene under heating. Then, while keeping the temperature of system at 170° C. and stirring, 1 g of dicumyl peroxide was added dropwise and, thereafter, the degradation treatment was performed for 1 hour. Next, 14 g of citraconic anhydride, 10 g of styrene and 0.5 g of benzoyl peroxide were added dropwise over 3 hours, respectively, and the mixture was reacted further for 1 hour. After the reaction, the reaction product was cooled to room temperature and then purified by throwing into a large quantity of acetone to obtain a modified polyolefin resin composition with weight average molecular weight of 74,000, grafted weight of citraconic anhydride of 11.3% by weight and grafted weight of styrene of 6.2% by weight.

Example 5

Into a biaxial extruder with L/D=34 and φ=40 mm, 80 parts by weight of propylene-ethylene-α-olefin copolymer (propylene component 68 mol %, ethylene component 8 mol %, butene component 24 mol %, weight average molecular weight 60,000), 20 parts by weight of ethylene-maleic anhydride copolymer (ethylene component 90% by weight, maleic anhydride component 10% by weight, weight average molecular weight 25,000), 4 parts by weight of maleic anhydride, 2 parts by weight of styrene and 1.5 parts by weight of di-t-butyl peroxide were charged. The reaction was conducted under the conditions of retention time of 10 minutes and barrel temperature of 160° C. (first barrel to seventh barrel), and deaeration was performed at seventh barrel to remove residual unreacted materials. The weight average molecular weight of modified polyolefin resin composition obtained was 51,000, the grafted weight of maleic anhydride was 3.1% by weight and the grafted weight of styrene was 1.1% by weight.

Example 6

Into a biaxial extruder with L/D=34 and φ=40 mm, 90 parts by weight of propylene-ethylene-α-olefin copolymer (propylene component 68 mol %, ethylene component 8 mol %, butene component 24 mol %, weight average molecular weight 60,000), 10 parts by weight of ethylene-methacrylic acid-maleic anhydride copolymer (ethylene component 85% by weight, methacrylic acid component 5% by weight, maleic anhydride component 10% by weight, weight average molecular weight 15,000), 10 parts by weight of citraconic anhydride, 20 parts by weight of styrene and 3 parts by weight of dicumyl peroxide were charged. The reaction was conducted under the conditions of retention time of 10 minutes and barrel temperature of 200° C. (first barrel to seventh barrel), and deaeration was performed at seventh barrel to remove residual unreacted materials. The weight average molecular weight of modified polyolefin resin composition obtained was 56,000, the grafted weight of citraconic anhydride was 7.9% by weight and the grafted weight of styrene was 12.2% by weight.

Comparative Example 1

In a four-neck flask attached with stirrer, cooling pipe and dropping funnel, 100 g of propylene-ethylene copolymer (propylene component 97.5 mol %, ethylene component 2.5 mol %, weight average molecular weight 250,000) were dissolved into 400 g of toluene under heating. Then, while keeping the temperature of system at 110° C. and stirring, 1 g of dicumyl peroxide was added dropwise and, thereafter, the degradation treatment was performed for 1 hour. Next, 12 g of maleic anhydride and 0.5 g of benzoyl peroxide were added dropwise over 3 hours, respectively, and the mixture was reacted further for 1 hour. After the reaction, the reaction product was cooled to room temperature and then purified by throwing into a large quantity of acetone to obtain a modified polyolefin resin composition with weight average molecular weight of 49,000 and grafted weight of maleic anhydride of 4.6% by weight.

Comparative Example 2

Into a biaxial extruder with L/D=34 and φ=40 mm, 100 parts by weight of propylene-ethylene-α-olefin copolymer (propylene component 68 mol %, ethylene component 8 mol %, butene component 24 mol %, weight average molecular weight 60,000), 10 parts by weight of maleic anhydride and 1.5 parts by weight of di-t-butyl peroxide were charged. The reaction was conducted under the conditions of retention time of 10 minutes and barrel temperature of 120° C. (first barrel to seventh barrel), and deaeration was performed at seventh barrel to remove residual unreacted materials. The weight average molecular weight of modified polyolefin resin composition obtained was 38,000 and the grafted weight of maleic anhydride was 4.5% by weight.

Comparative Example 3

Into a biaxial extruder with L/D=34 and φ=40 mm, 80 parts by weight of propylene-ethylene-5-vinyl-2-norbornene copolymer (propylene component 75 mol %, ethylene component 20 mol %, 5-vinyl-2-norbornene component 5 mol %, weight average molecular weight 50,000), 20 parts by weight of ethylene-maleic anhydride copolymer (ethylene component 98 mol %, maleic anhydride component 2 mol %, weight average molecular weight 15,000), 50 parts by weight of citraconic anhydride and 1 part by weight of lauroyl peroxide were charged. The reaction was conducted under the conditions of retention time of 10 minutes and barrel temperature of 120° C. (first barrel to seventh barrel), and deaeration was performed at seventh barrel to remove residual unreacted materials. The weight average molecular weight of modified polyolefin resin composition obtained was 18,000 and the grafted weight of citraconic anhydride was 22.6% by weight.

Comparative Example 4

Into a biaxial extruder with L/D=34 and φ=40 mm, 100 parts by weight of ethylene-ethyl acrylate-maleic anhydride copolymer (Bondine FX8000 from Sumika Atochem), 6 parts by weight of aconitic anhydride and 2 parts by weight of dicumyl peroxide were charged. The reaction was conducted under the conditions of retention time of 10 minutes and barrel temperature of 120° C. (first barrel to seventh barrel), and deaeration was performed at seventh barrel to remove residual unreacted materials. The modified polyolefin resin composition obtained showed gel, which was insoluble into solvent.

Comparative Example 5

Into a biaxial extruder with L/D=34 and φ=40 mm, 90 parts by weight of propylene-ethylene-α-olefin copolymer (propylene component 68 mol %, ethylene component 8 mol %, butene component 24 mol %, weight average molecular weight 60,000), 10 parts by weight of ethylene-methacrylic acid-maleic anhydride copolymer (ethylene component 85% by weight, methacrylic acid component 5% by weight, maleic anhydride component 10% by weight, weight average molecular weight 35,000), 10 parts by weight of maleic anhydride, 50 parts by weight of styrene and 1.5 parts by weight of di-t-butyl peroxide were charged. The reaction was conducted under the conditions of retention time of 10 minutes and barrel temperature of 170° C. (first barrel to seventh barrel), and deaeration was performed at seventh barrel to remove residual unreacted materials. The grafted weight of maleic anhydride of modified polyolefin resin composition obtained was 8.1% by weight and the grafted weight of styrene was 32.6% by weight, which was insoluble into solvent.

Of said modified polyolefin resin compositions obtained in Examples 1 through 6 and Comparative examples 1 through 3, 10% by weight toluene solutions were prepared and following tests were performed. The results are shown in Table 1.

Tack Test

Said toluene solution was coated onto a polypropylene film after corona surface treatment using #20 Meyer bar, which was dried for 15 hours at room temperature. The specimen was folded so as the coated surfaces to overlap and, after pressed down lightly with fingers, they were peeled off to evaluate the tack from the peeling liability.

Adherence Test

Said toluene solution was spray painted onto an ultrahigh rigidity polypropylene plate so as the thickness of dried film to become not less than 10 μm and not more than 15 μm, which was dried for 30 minutes at 80° C. After the specimen was allowed to stand for 3 days at room temperature, slits reaching the base were engraved with cutter to make 100 crosscuts at intervals of 1 mm. Then, cellophane adhesive tape was stuck closely thereon and peeled off five times in the direction of 180 degrees to count the number of remaining cross-cuts.

Heat Seal Strength Test

Said toluene solution was coated onto a polypropylene film after corona surface treatment using #20 Meyer bar, which was dried for 15 hours at room temperature. The coated surfaces were superposed between themselves and heat sealed under the conditions of 1.5 kg/cm$^2$, 90° C. and 10 sec using No.276 Heat Seal Tester (from Yasuda Seiki Seisakusho). Each specimen was cut so as the width to become 1 cm and peeled off under the conditions of 5 kg weight and 100 mm/min using tensile tester to measure the peeling strength. Tests were made three times and the result was expressed by the average value.

TABLE 1

Test results

| Sample | Solvent solubility | Adherence test 100/100 | Heat seal strength (g/1.5 cm) | Tack |
|---|---|---|---|---|
| Example | | | | |
| 1 | ○ | 100/100 | 450 | None |
| 2 | ○ | 100/100 | 420 | None |
| 3 | ○ | 100/100 | 450 | None |
| 4 | ○ | 100/100 | 550 | None |
| 5 | ○ | 100/100 | 600 | None |
| 6 | ○ | 100/100 | 620 | None |
| Comparative example | | | | |
| 1 | Δ~x | 90/100 | 420 | Strong |
| 2 | Δ | 90/100 | 440 | Strong |
| 3 | ○ | 80/100 | 300 | Strong |

Note) ○: Good Δ: Turbid x: Insoluble

Paint Test

Of the modified polyolefin resin compositions obtained in Examples 1 through 6 and Comparative examples 1 through 3, 40% by weight toluene solutions were prepared, respectively, and paints of following formulations were prepared making them as binder resins.

| | | |
|---|---|---|
| Binder resin (40% toluene solution): | 100 | pts. by weight |
| Alkyd resin (Phthalkyd V904, from: Hitachi Chemical) | 15 | " |
| $TiO_2$: | 5 | " |
| Carbon black: | 1 | " |
| Rouge: | 2 | " |
| Talc: | 15 | " |
| Silica delustering agent: | 5 | " |

After kneaded for about 1 hour in a sand mill, said composition was diluted with toluene so as the viscosity to become 12 to 13 sec/20° C. through Ford cup #4 for adjustment. Each paint was spray coated onto an ultrahigh rigidity polypropylene plate so as the dried film thickness to become not less than 30 $\mu$m and not more than 35 $\mu$m, which was dried for 30 minutes at room temperature and then baked for 30 minutes at 80° C. After the specimen was allowed to stand for 48 hours at room temperature, following tests were performed. The results are shown in Table 2.

Adherence Test

The crosscuts test similar to above was performed.

Warm Water Resistance Test

The specimen was soaked into warm water for 240 hours at 40° C. to visually observe the state of painted film. In addition, the adherence test by crosscuts test was performed.

Gasoline Resistance Test

A scratch (X mark) reaching the base was engraved on the surface of each painted film with cutter knife, which was soaked into gasoline to visually observe the state of painted film.

TABLE 2

Test results

| Sample | Adherence test | Warm water resistance test | Gasoline resistance test |
|---|---|---|---|
| Example 1 | 100/100 | No abnormality 100/100 | After 2 hr soaking, no abnormality |
| 2 | 100/100 | No abnormality 100/100 | After 2 hr soaking, no abnormality |
| 3 | 100/100 | No abnormality 100/100 | After 2 hr soaking, no abnormality |
| 4 | 100/100 | No abnormality 100/100 | After 2 hr soaking, no abnormality |
| 5 | 100/100 | No abnormality 100/100 | After 2 hr soaking, no abnormality |
| 6 | 100/100 | No abnormality 100/100 | After 2 hr soaking, no abnormality |
| Comparative example 1 | 90/100 | No abnormality 80/100 | After 2 hr soaking, no abnormality |
| 2 | 85/100 | No abnormality 90/100 | After 2 hr soaking, no abnormality |
| 3 | 70/100 | Blister generation 10/100 | After 45 min soaking, abnormality generation |

Primer Test

Of the modified polyolefin resin compositions obtained in Examples 1 through 6 and Comparative examples 1 through 3, 10% by weight toluene solutions were prepared, respectively, and each was spray coated onto an ultrahigh rigidity polypropylene plate so as the dried film thickness to become not less than 10 $\mu$m and not more than 15 $\mu$m, which was dried for 30 minutes at 80° C. Next, two-component upper white paint was spray coated so as the dried film thickness to become not less than 45 $\mu$m and not more than 50 $\mu$m. After allowed to stand for 15 minutes at room temperature, this was baked for 30 minutes at 90° C. After the specimen was allowed to stand for 3 days at room temperature, test similar to said paint test was performed. Results are shown in Table 3.

| Sample | Adherence test | Warm water resistance test | Gasoline resistance test |
|---|---|---|---|
| Example 1 | 100/100 | No abnormality 100/100 | After 2 hr soaking, no abnormality |
| 2 | 100/100 | No abnormality 100/100 | After 2 hr soaking, no abnormality |
| 3 | 100/100 | No abnormality 100/100 | After 2 hr soaking, no abnormality |
| 4 | 100/100 | No abnormality 100/100 | After 2 hr soaking, no abnormality |
| 5 | 100/100 | No abnormality 100/100 | After 2 hr soaking, no abnormality |
| 6 | 100/100 | No abnormality 100/100 | After 2 hr soaking, no abnormality |
| Comparative example 1 | 80/100 | No abnormality 85/100 | After 2 hr soaking, no abnormality |
| 2 | 90/100 | No abnormality 90/100 | After 2 hr soaking, no abnormality |
| 3 | 90/100 | Blister generation 30/100 | After 30 min soaking, abnormality generation |

Ink Test

Of the modified polyolefin resin compositions obtained in Examples 1 through 6 and Comparative examples 1 through 3, 40% by weight toluene/ethyl acetate (80/20, weight ratio) solutions were prepared, respectively, and inks of following formulations were prepared making them as binder resins.

| Binder resin (40% mixed solution): | 100 | pts. by weight |
| Urethane resin for ink: | 50 | " |
| TiO$_2$: | 100 | " |
| Ethyl acetate: | 100 | " |
| Isopropyl alcohol: | 50 | " |

Said composition was milled in a paint shaker to prepare white printing ink. The printing ink obtained was coated onto each film of polyester (PET), nylon (NY) and oriented polypropylene (OPP) with #12 Meyer bar. Cellophane tape was stuck on the coated surface and the state of coated surface was observed visually when peeled off this rapidly. Results are shown in Table 4.

TABLE 4

Test results

| | | Adhesiveness | | |
| Sample | Compatibility | OPP | PET | NY |
| Example 1 | ○ | ○ | ○ | ○ |
| 2 | ○ | ○ | ○ | ○ |
| 3 | ○ | ○ | ○ | ○ |
| 4 | ○ | ○ | ○ | ○ |
| 5 | ○ | ○ | ○ | ○ |
| 6 | ○ | ○ | ○ | ○ |
| Comparative example 1 | Δ | ○ | ○ | ○ |
| 2 | x | ○ | ○ | ○ |
| 3 | Δ | ○ | ○ | ○ |

Note) Compatibility ○: Good Δ: Turbid x: Two-layer separation
Adhesiveness ○: No peeling When comparing Examples 1 through 6 and Comparative examples 1 through 3 from Table 1, in the tack, examples being modified polyolefin resin compositions have no tack, while Comparative examples 1 through 3 being maleic acid-modified polyolefins have strong tack. With respect to Comparative example 3, it is understood that poor adherence originates from low molecular weight.

With respect to the compatibility and solvent solubility, it can be seen from the results of Tables 1 and 4 that examples are more excellent than comparative examples. Moreover, it was ascertained that Comparative examples 4 and 5 were insoluble into solvent due to gel and high-molecular weight components produced by crosslinking.

On the other hand, looking at the heat seal strength, all examples show values of 400 to 500. Deserving special mention is that the inventive modified polyolefin resin compositions have equal to or higher heat seal strength than maleic acid-modified polyolefins having tack. Moreover, it was observed that the samples in examples after measurement of heat seal strength had the peeling surface caused not from substrate, but between adhesive layers. It can be seen therefore that the inventive modified polyolefin resin compositions have strong adherence to nonpolar substrates.

Furthermore, the inventive modified polyolefin resin compositions show excellent results also in paint test, primer test and ink test.

Based on the points as above, it can be said that the inventive modified polyolefin resin compositions are very useful, since they show excellent solvent solubility and compatibility, no tack and excellent adherence at the same time.

What is claimed is:

1. A modified polyolefin resin composition, obtainable by graft modifying a mixed resin comprising (A) 40 to 99 parts by weight of a polyolefin; and
(B) 1 to 60 parts by weight of an ethylenic compound-unsaturated carboxylic acid anhydride compound copolymer selected from the group consisting of an ethylene-maleic anhydride copolymer, an ethylene-propylene-maleic anhydride copolymer, an ethylene-propylene-butene-maleic anhydride copolymer, an ethylene-propylene-diene-maleic anhydride copolymer, a copolymer of ethylene and maleic anhydride with (meth)acrylic acid or (meth)acrylic ester, a copolymer of ethylene, propylene and maleic anhydride with (meth)acrylic acid or (meth)acrylic ester, a copolymer of ethylene, propylene, butene and maleic anhydride with (meth)acrylic acid or (meth)acrylic ester, a copolymer of ethylene, propylene, diene and maleic anhydride with (meth)acrylic acid or (meth) acrylic ester, and a mixture thereof;

wherein (B) comprises 0.1 to 50% by weight of the unsaturated carboxylic acid anhydride compound;

with an unsaturated carboxylic acid and/or its anhydride (C);

wherein the modified polyolefin resin composition has a weight average molecular weight of 20,000 to 150,000 and a grafting weight of (C) of 0.1 to 20% by weight.

2. The composition according to claim 1, wherein said polyolefin is a homo- or co-polymer of an α-olefin having not less than 2 and not more than 20 carbon atoms.

3. The composition according to claim 1, wherein a proportion of propylene in said polyolefin is not less than 50% to not more than 98%.

4. The composition according to claim 1, wherein (C) is maleic anhydride or aconitic anhydride.

5. The composition according to claim 1, wherein (B) comprises 1–40% by weight of the unsaturated carboxylic acid anhydride compound.

6. The composition according to claim 1, which comprises 50 to 95% of (A).

7. The composition according to claim 1, wherein a grafting weight of (C) is 1–10% by weight.

8. The composition according to claim 1, further comprising a stabilizer.

9. The composition according to claim 1, further comprising a radical initiator.

10. A modified polyolefin resin composition, obtainable by graft modifying a mixed resin comprising (A) 40 to 99 parts by weight of a polyolefin; and
(B) 1 to 60 parts by weight of an ethylenic compound-unsaturated carboxylic acid anhydride compound copolymer selected from the group consisting of an ethylene-maleic anhydride copolymer, an ethylene-propylene-maleic anhydride copolymer, an ethylene-propylene-butene-maleic anhydride copolymer, an ethylene-propylene-diene-maleic anhydride copolymer, a copolymer of ethylene and maleic anhydride with (meth)acrylic acid or (meth)acrylic ester, a copolymer of ethylene, propylene and maleic anhydride with (meth)acrylic acid or (meth) acrylic ester, a copolymer of ethylene, propylene, butene and maleic anhydride with (meth)acrylic acid or (meth)acrylic ester, a copolymer of ethylene, propylene, diene and maleic anhydride with (meth)acrylic acid or (meth) acrylic ester, and a mixture thereof;

wherein (B) comprises 0.1 to 50% by weight of the unsaturated carboxylic acid anhydride compound;

with an unsaturated carboxylic acid and/or its anhydride (C) and an ethylenic unsaturated compound (D) which is different from (C);

wherein the modified polyolefin resin composition has a weight average molecular weight of 20,000 to 150,000 and a grafting weight of each of (C) and (D) of 0.1 to 20% by weight.

11. An adhesive containing the modified polyolefin resin composition of claim 1 or 10.

12. A primer containing the modified polyolefin resin composition of claim 1 or 10.

13. A paint binder containing the modified polyolefin resin composition of claim 1 or 10.

14. An ink binder containing the modified polyolefin resin composition of claim 1 or 10.

15. The composition according to claim 10, wherein (D) is selected from the group consisting of a (meth)acrylic ester having 1 to 12 carbon atoms, a vinyl ether, a styrenic compound, and a maleimide.

16. The composition according to claim 10, wherein a grafting weight of (D) is 1–10% by weight.

* * * * *